United States Patent [19]
Patrickson et al.

[11] Patent Number: 4,457,731
[45] Date of Patent: Jul. 3, 1984

[54] CATHODE RAY TUBE PROCESSING

[75] Inventors: David J. Patrickson; John D. Webster, both of Seneca Falls; Edward Schwartz, Auburn, all of N.Y.

[73] Assignee: U.S. Philips Corporation, New York, N.Y.

[21] Appl. No.: 425,351

[22] Filed: Sep. 28, 1982

[51] Int. Cl.³ .......................... H01J 9/50; H01J 9/44
[52] U.S. Cl. ........................................ 445/2; 445/5; 445/6
[58] Field of Search .................................. 445/2, 5, 6

[56] References Cited
U.S. PATENT DOCUMENTS

| | | | |
|---|---|---|---|
| 4,125,306 | 11/1978 | Coble | 445/5 |
| 4,392,834 | 7/1983 | Smith | 445/6 |
| 4,395,242 | 7/1983 | Liller et al. | 445/5 |
| 4,398,897 | 8/1983 | Nubani et al. | 445/5 |

Primary Examiner—Kenneth J. Ramsey
Attorney, Agent, or Firm—Joseph P. Abate

[57] ABSTRACT

A method of processing regunned cathode ray tubes by exhausting/baking the tube, aging the cathode, and only then flashing the getter. Finally, the gettered tube is high voltage conditioned before testing.

3 Claims, 5 Drawing Figures

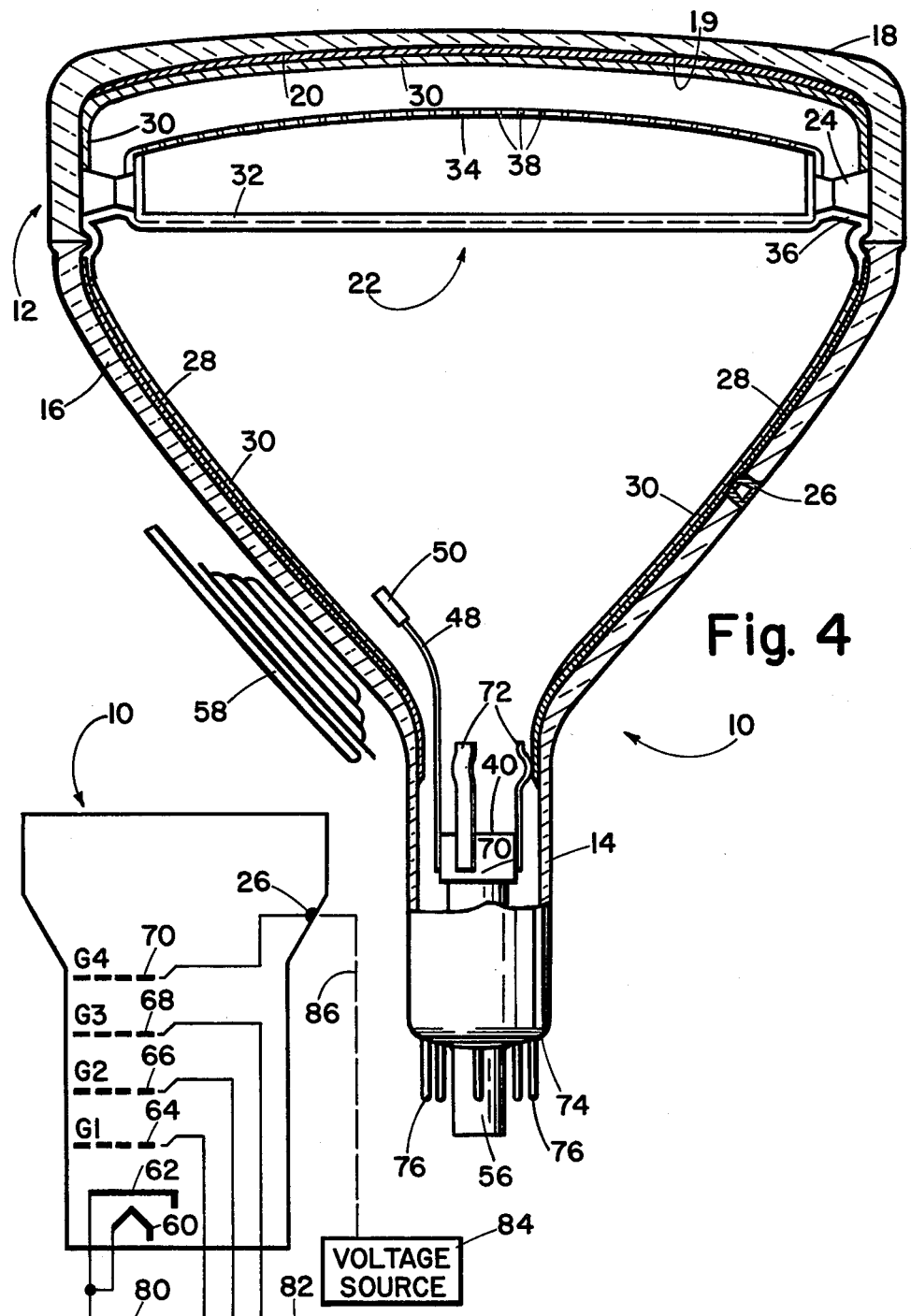

CATHODE RAY TUBE PROCESSING

BACKGROUND OF THE INVENTION

1. Field of The Invention

The present invention relates to the processing of cathode ray tubes and particularly to the processing of such tubes which have been previously processed by flashing of a barium-containing getter in the tube, and were reworked and now require a second processing including a second flashing of the getter.

Cathode ray tubes, whether of the monochrome or color variety, basically comprise a cathodoluminescent screen and at least one electron beam generating means contained within an evacuated glass envelope. The envelope is usually funnel-shaped, the expansive portion having a closed end in the form of a face panel with the cathodoluminescent screen disposed relative to the interior surface of the panel. Within the neck portion of the funnel, one or more electron guns are oriented in a manner to beam electrons accurately to the screen. A typical electron gun includes an electron emissive source aligned with the apertures of several axially spaced grid electrodes which control, accelerate and focus the emitted electron beam. Usually, a sealed exhaust tubulation projects externally from the closed end of the neck portion as does an array of metallic pins effecting external electrical connections for the several internal tube components.

There are occasions when a cathode ray tube is found to contain a malfunctioning or defective component, for example, an electron gun. Such an occasion may arise during tube manufacture or as a result of tube operation. It is then conventional practice to repair the tube by removing the defective gun and replacing it with a new one. Essentially, this practice involves breaking the vacuum of the tube, for example, with ambient air, removing the defective gun by cutting off a portion of the neck, sealing a new neck portion thereto and sealing a replacement gun into the renecked tube. The regunned tube may then be normally processed in the same manner as virgin tubes. This normal processing includes, in the sequence recited, the general steps of exhausting and baking the tube to outgas the internal tube components, sealing the tube to form a closed vacuum vessel, gettering, aging and then high-voltage conditioning the tube. The proposed tube is finally subjected to the standard operating tests (raster, dot, etc.).

While testing such conventionally processed regunned cathode ray tubes, approximately 70%-80% manifest an undesireable condition, namely, a dark-centered cathode. Investigation has revealed that this dark center is a carbon layer which has deposited on the electron emissive surface of the replacement cathode. This carbon layer can reduce the cathode electron emission.

2. Description of The Prior Art

After normally baking/exhausting the tube to a vacuum, and then tube sealing, it has been usual practice to getter and then to age the sealed tube. Gettering the tube further reduces the pressure within the tube envelope. Aging the tube stabilizes the electron emissive characteristics of the cathode.

Gettering the tube involves using getters containing barium which is flashed or vaporized within the tube. The vaporized getter material, barium, sorbs the residual gases within the tube and removes them as low vapor-pressure solid condensates. Also, the barium film which is deposited on the internal surfaces of the tube continues to sorb gases which are liberated during normal tube operation.

During tube or, more particularly, cathode aging, the cathode is heated and electron currents not less than normal operating currents are drawn from the cathode to other various grid electrodes for a time sufficient to stabilize the cathode emission. This aging step also beneficially removes contaminants from the electron bombarded grid electrodes while liberating trapped gases in and around them. Some of these gases are adsorbed by the barium film while other formerly trapped gases become part of the tube's internal atmosphere.

The grid electrodes of a virgin or regunned tube commonly may then be subjected to high-voltage potential differences which burn off additional undesired contaminants, points, particles, etc. from the electrodes before the tube is tested. As is well known, such high-voltage conditioning or "spot knocking" inhibits the occurrence of inter-electrode arcing during normal tube operation.

Significantly, the conventional step sequence of getter flashing before cathode aging and tube conditioning, heretofore, has been held inviolate by the industry. There has been a universally held belief that an operational vacuum, that is a vacuum approximately equal to that existing during normal tube operation, was necessary for proper aging or conditioning. Accordingly, getter flashing, which acts as a chemical pump to decrease the pressure within the tube, has been performed before the other steps. Further, it was believed that flashing in any other position of the manufacturing cycle could degrade the beneficial results of aging the cathode or high-voltage conditioning the tube by over flashing the getter.

This conventional processing for regunned cathode ray tubes has resulted in high tube scrap levels caused by dark-centered cathodes. In fact, approximately 15% of all regunned tubes exhibiting a dark-centered cathode must be scrapped. This is wasteful. The remaining approximately 85% of such tubes exhibit an impaired focus quality during operation.

Because a regunned tube has been completely processed once before during its original manufacture, including flashing the barium getter, the original barium film becomes oxidized and reacts with moisture to form hydrates when the original gun is removed from the neck, for example, by cracking the neck glass. Exhausting and baking the tube at approximately 400° C. which precedes the second getter flashing does not remove the waters of hydration. However, while flashing the second getter, temperatures sufficient to decompose the hydrates are attained. The moisture so released reacts with metal carbides already present within the tube to produce hydrocarbon gases. The substantial electron activity, including secondary emission, which occurs in and around the gun area of the tube during cathode aging ionizes these hydrocarbon gases into various positive ions including those bearing carbon. These carbon bearing ions, presumably, are not adsorbed by the second getter film before they are attracted to the nearby highly-negative cathode. Upon decomposition, the ions deposit as carbon on the electron emitting surface of the cathode to form the dark center.

Prior art attempts to avoid this carbon center have proven less than satisfactory. For example, in U.S. Pat. No. 4,048,545, the original barium film is treated with a gas mixture consisting of $CO_2$ and water vapor soon after cracking the tube neck glass. Theoretically, the original barium film is converted to stable barium carbonate and the $H_2O$ from the barium hydrates is removed before the tube is regunned and conventionally processed. In practice, however, drawbacks still remain because the prior art treatment continues to result in a substantial number of regunned tubes exhibiting a dark-centered cathode. Possibly, there is not a complete conversion of the original barium film to the relatively stable carbonate. Also, the prior art method disadvantageously requires additional gases and their associated gas handling systems both of which increase the commercial expense of processing regunned tubes.

SUMMARY OF THE INVENTION

The principle object of the present invention, therefore, is to overcome the drawbacks and disadvantages of the prior art.

A further object of this invention is to provide a processing method which, reliably and economically, in a minimum number of steps, avoids the development of dark-centered cathodes in regunned cathode ray tubes.

According to the inventive method, the getter is flashed only after the cathode is aged. Thus, the inventive method reverses the dogmatic prior art sequence of steps, namely, flashing and then aging. Further, the necessity for the additional and more costly prior art step of converting the barium film to barium carbonate is eliminated.

Surprisingly, regunned cathode ray tubes processed according to the invention manifest virtually no dark-centered cathodes during testing. Also, such tubes exhibit a tube life at least as long as conventionally processed virgin tubes.

BRIEF DESCRIPTION OF THE DRAWING

The present invention will now be described in more detail when taken in conjunction with the accompanying drawing, in which:

FIG. 4 is a partial cross-sectional view of a previously gettered cathode ray tube to be processed in accordance with the method shown in FIG. 3; and FIG. 5 is a schematic representation of one electron gun within the cathode ray tube of FIG. 4.

DETAILED DESCRIPTION OF THE PREFERRED EMBODIMENT

Figure 1:
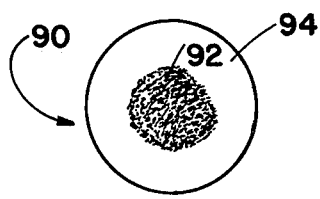
FIG. 1 is an enlarged top-plan view of a dark centered cathode.
Figure 2:
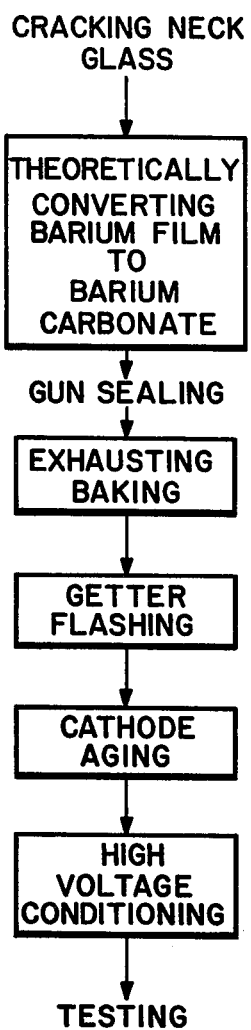
FIG. 2 is a diagrammatic flow chart of the prior art steps for processing regunned cathode ray tubes.

Referring now to the figures and FIG. 1 in particular, there is shown a top-plan view of a single cathode 90 removed from a regunned cathode ray tube soon after being processed according to the prior art, for example, as shown in FIG. 2.

Cathode 90 has a carbon layer 92 deposited on the electron emissive surface 94 thereof and is an undesireable dark-centered cathode. Such a cathode degrades the ability of the electron gun to focus the electron beam onto the screen during normal tube operation.

Figure 3:
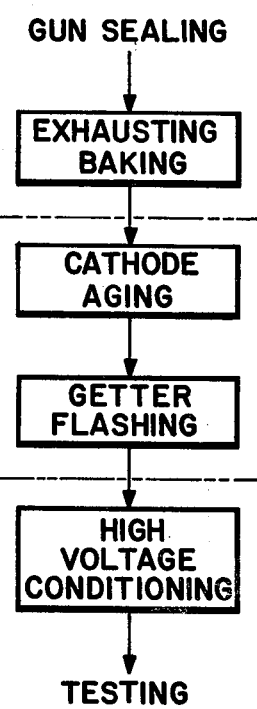
FIG. 3 is a diagrammatic flow chart of a preferred method according to the invention in which the getter is flashed only after the cathode is aged.

The occurrence of this dark-centered cathode is avoided by the inventive method which is shown in FIG. 3. The essential inventive step sequence of gettering the tube only after aging the cathode is shown within the dotted and dashed curve.

FIG. 4 illustrates a regunned cathode ray tube 10 ready for processing according to the present invention. Tube 10 may be, for example without limitation, of the shadow masked color variety employing three electron guns within the gun assembly 40. Tube 10 has a glass envelope 12 integrally comprising a new neck portion 14, a funnel portion 16 and a panel portion 18 all sealed together in a manner well-known. A patterned cathodoluminescent screen 20 of selected electron responsive phosphors is formed on the inner surface 19 of the panel portion 18. An aluminum layer (not shown) may be deposited over the phosphors on their sides facing internal of the tube in order to increase the luminescense of these phosphors in the forward direction. Adjacent to the screen 20 and spaced therefrom is a shadow masked structure 22 comprising a supporting frame 32 and a peripherally attached apertured mask 34. The frame 32 is oriented within panel 18 by support means 24. Mask 34 has a multiplicity of mutually spaced apertures 38 suitably aligned with the phosphors of the screen 20.

Extending from the mask frame 32 is a connection 36 which makes electrical contact with an inner electrically conductive coating 28 disposed on the interior surface of the funnel 16. The coating 28 extends partially into the neck portion 14 of the envelope 12.

An anode button or high-voltage electrode 26 is affixed to and extends through the funnel portion 16 to contact the conductive coating 28 electrically.

Suitably oriented within the neck portion 14 and appropriately aligned with the mask 34 is a replacement electron gun assembly 40 which, in the instant example, may include three electron guns disposed in either an in-line or delta configuration.

For clarity, the three guns may be of the bi-potential focus type one of which is shown schematically in FIG. 5.

Each electron gun includes a heater, cathode, G1 grid electrode, G2 grid electrode, G3 grid electrode, and G4 grid electrode, 60, 62, 64, 66, 68, and 70, respectively, which are all mutually spaced and electrically connected to form an electron gun in a manner well-known. The G1, G2, G3, and G4 electrodes 64, 66, 68 and 70, control, accelerate and focus an electron beam emitted from the cathode 62 onto the screen 20 during tube operation. The electrode 70 (FIG. 4) of the gun assembly 40 has a plurality of resilient snubber means 72 making pressurized electrical contact with the conductive coating 28 extending into the neck portion 14. Spaced from and supported relative thereto by a positioner or antenna 48 extending from the G4 electrode 70 is a getter 50 containing, for example, barium.

Gun assembly 40 also includes a circular glass mount (not shown) which supports the other gun elements and has a plurality of electrically conductive metallic pins 76 embedded therein and extending therethrough to provide electrical connections from outside the tube 10 to the elements of gun assembly 40 in a known manner.

The assembly 40 is accurately sealed onto the neck portion 14 of the envelope 12 on what is called a sealing machine, by applying sufficient heat to the neck portion 14 and gun assembly 40 to seal the circular mount to the neck. Thus, the mount may form the closed end 74 of the neck portion 14. The gun assembly 40 may reach temperatures of between 300°–450° C. during this gun sealing step.

An exhaust tubulation 56 extends from the closed end 74 to permit evacuation of the tube during the exhaust-/bake step.

Disposed on portions of the internal surface of the tube 10 is a film 30 of barium resulting from the previous flashing of a barium containing getter during the original tube manufacture. Such films ordinarily have a thickness on the order of zero to 10 microns. The film 30 typically covers the screen 20 and a large portion of the internal surface area of the tube as shown in FIG. 4.

After sealing in the electron gun assembly 40, the tube 10 is then processed according to the invention (FIG. 3). This may take approximately 1½ to 2½ hours. The tube 10 is taken first to an exhaust machine (essentially a long oven combined with an exhaust system) for baking out and degassing of the tube elements, during a simultaneous exhausting of the tube to a typical pre-flash vacuum of $1 \times 10^{-5}$ Torr. This baking procedure substantially degasses the envelope 12, screen 20, shadow masked structure 22, coating 28, gun assembly 40 and the film 30 by means of heat applied externally to the tube. The 400° C. temperatures attained during the baking step are not sufficient to decompose the already formed barium hydrates which may remain as solids within the tube. Evacuation of the tube 10 is accomplished through extended pumping during the heating sequence by means of an external vacuum system (not shown) connected to the exhaust tubulation 56.

During at least part of this exhaust/bake step, the cathodes 62 (only one of which is shown in FIG. 5) are heat activated by energizing the adjacent cathode heater 60 via appropriate pins 76 electrically connected to a suitable electrical supply source—e.g. voltage source 80. This cathode heating chemically converts the emission materials on the surface of the cathode to an electron emitting state.

The tubulation 56 is then heat sealed to convert the tube 10 into a closed vessel. The sealed tube 10 is removed from the exhaust machine and placed on a process line which transports the tube through the remaining process steps of aging, flashing and conditioning. The tube is then taken off the process line and finally tested.

According to the present invention, a regunned tube 10 is now aged to stabilize the electron emission characteristics of the cathodes. Cathode aging is accomplished by applying varying voltages to the heaters 62 and grid electrodes 64, 66, 68 (FIG. 5) in accordance with a fixed schedule. The electron currents drawn from the cathodes to the various grid electrodes also release trapped gases within and around the electrodes while they remove contaminants from them. See, for example, a type of vacuum tube aging disclosed in U.S. Pat. No. 2,943,904.

In order to avoid certain cathode emission slump problems during tube operation, some manufacturers use relatively high cathode currents during what is termed, therefore, a high-current aging step. During high-current aging, a total cathode current on the order of 10–25 milliamperes is drawn to each of the G1, G2 or G3 grid electrodes. This total current is 10–25 times the total normal operating cathode current of one milliampere drawn from the three electron guns toward the screen during color picture tube operation. These high currents are realized, for example, by applying various suitable potentials to each heater/cathode 60, 62 and to the electrodes 64, 66, 68 from appropriate voltage sources 80, 82 (FIG. 5) according to a fixed schedule.

During one such schedule, the anode or G4 electrode 70 floats (no applied voltage) and constant D.C. voltages in the following ranges are applied simultaneously to each of the heaters/cathodes and grid electrodes:

| Heater/Cathode | G1 | G2 | G3 | Period |
|---|---|---|---|---|
| 7–11 volts | | FLOAT | | 2–3 minutes |
| 8–9.5 volts | 40 v | 500–600 v | Float | 9–11 minutes |
| 8–9 volts | 40 v | 600 v | 600 v | 5 minutes |
| 8–7.5 volts | 40 v | 600–500 v | | 10–12 minutes |

Accordingly, when voltages of 8.5 v, 40 v and 550 v are applied, respectively, to the heaters/cathodes 60,62, G1 electrode 64 and G2 electrode 66, a total cathode current of 21 milliamperes is drawn to the G1 electrode and a current of 15 milliamperes is drawn to the G2 electrode.

The cathode currents drawn to the grid electrodes, especially during high-current aging, ionize some of the gasses within the gun assembly area of the tube through direct electron bombardment and also through secondary emission from the grid electrodes. Apparently, because the hydrocarbon gases which otherwise would have been formed by the prior art processing are not present when the cathodes are aged before flashing according to the invention, no carbon layer forms on the cathode.

After the aging step, the getter 50 is flashed by techniques known to the art, such as that disclosed in U.S. Pat. No. 3,816,788. The getter material (barium) is heated by induction. An R.F. current through coil 58 (FIG. 4) creates eddy currents whose energy is dissipated as heat within the getter material. This getter flashing further reduces the pressure within the tube from about $1 \times 10^{-5}$ Torr to about $1 \times 10^{-7}$ Torr (operational vacuum) and deposits a new barium film on portions of the tube's internal surface. The new film will adsorb undesired gasses, for example, $N_2$, $O_2$, CO, $CO_2$, $H_2O$, released from the tube components during the life of the tube.

As a final step, the flashed tube is high-voltage conditioned typically by applying a high-voltage potential on the order of 40 KV or more supplied from an external voltage source 84 electrically connected by means of connective lead 86 (shown as a dashed line in FIG. 5) to the anode button 26. The potential may be, for example, a pulsed or constant D.C. high-voltage. Button 26 is in turn electrically coupled with the G4 grid electrode 70 of the gun assembly 40. The grid electrodes 64, 66, 68, cathodes 62, and heaters 60, are all connected to ground by means of connections to ground units 80, 82 to cause a high-voltage sparking condition between the G3 grid electrode and the G4 grid electrode. This high-voltage conditioning beneficially discharges or minimizes microscopic sources of field emission such as foreign particles and inter-electrode projections which could contribute to detrimental interelectrode arcing during tube use.

Regunned cathode ray tubes processed according to the inventive method have exhibited essentially no instances of dark-centered cathode when tested.

Further, although various techniques, procedures and schedules for accomplishing each general step of the inventive method (FIG. 3) are known to C.R.T. manufacturers, and additional steps are sometimes used, the inventors believe that all of these general steps are currently employed by manufacturers to produce a commercially acceptable cathode ray tube. The crucial aspect of the present invention is the step sequence, namely, flashing the getter only after aging the cathode. Also, additional operations conceivably can be performed between the general steps although the inventors are not aware of such steps being utilized between the aging and getter flashing steps.

It is to be stressed that the chemical and electrical mechanisms producing dark-centered cathodes are not fully understood. It follows that the reasons for the beneficial effects obtained by the inventive method are also not fully understood. Apparently, the hydrocarbon gas ionization which occurs by getter flashing and then cathode aging does not occur when the aging precedes getter flashing. Presumably, the fact that electron currents are never again drawn from the cathodes in such a manner to bombard the nearby grid electrodes and produce concentrated electron activity in the gun area is involved in these mechanisms. During normal operation, the electron beams generally do not bombard the grid electrodes but rather pass through the respective grid apertures on their paths to the screen.

Whatever the chemical and electrical mechanisms involved, processing according to the inventive method has typically reduced the incidence of scrap in regunned cathode ray tubes caused by dark-centered cathodes from approximately 14% to 0.5%. This results in considerable commercial savings combined with complete process compatability with existing tube manufacturing methods.

Further, although the occurrence of such carbon deposits in originally processed virgin tubes is not a problem, virgin tubes also advantageously may be processed according to the inventive method which then provides for uniform processing of both virgin and regunned tubes.

Life tests conducted for 5000 hours on regunned and virgin tubes processed according to the present invention resulted in no instances of a dark-centered cathode and, in fact, resulted in a tube quality often superior to that obtained by the prior art.

There has been shown and described a processing method which reliably and economically avoids the occurrence of dark-centered cathodes in regunned cathode ray tubes. It will be obvious to those skilled in the art that various changes and modifications, such as performing a part of the high-voltage conditioning step before cathode aging, may be made therein without departing from the spirit and scope of the invention as defined by the appended claims.

What is claimed is:

1. A method of processing a cathode ray tube which has been previously gettered by the flashing of a barium containing material therein and, thus, has a barium film on portions of its internal surface, and which has been regunned by removing the original gun from the neck of the tube and then sealing therein a replacement gun having a cathode, a plurality of mutually spaced grid electrodes and a barium-containing getter extending from one of the electrodes, said method including baking and exhausting the tube to a pre-flash vacuum, then sealing the evacuated tube to form a closed vessel, and the improvement comprising the steps of:

aging the tube including heating the cathode and drawing a current therefrom to at least one grid electrode, so that the electron emission from the cathode is stabilized, and then gettering the aged tube by flashing the barium-containing getter therein, whereby the occurrence of a dark-centered cathode is substantially avoided.

2. The method as claimed in claim 1, wherein the current drawn from the cathode to the at least one grid electrode is in a range between 10 to 25 times the current drawn from the cathode during normal operation of the tube.

3. The method as claimed in claim 1 or 2, further comprising the step of high-voltage conditioning the tube to reduce the occurrence of arcing between the grid electrodes.

* * * * *

UNITED STATES PATENT AND TRADEMARK OFFICE
CERTIFICATE OF CORRECTION

PATENT NO. : 4,457,731
DATED : July 3, 1984
INVENTOR(S) : DAVID J. PATRICKSON ET AL It is certified that error appears in the above-identified patent and that said Letters Patent is hereby corrected as shown below:

In the title page:

The Assignee should be

--NORTH AMERICAN PHILIPS CONSUMER ELECTRONICS CORP.--

Col. 1, line 47, change "proposed" to --processed--

Col. 3, line 17, change "principle" to --principal--

Signed and Sealed this

Ninth Day of April 1985

[SEAL]

Attest:

DONALD J. QUIGG

Attesting Officer  Acting Commissioner of Patents and Trademarks